(12) United States Patent  
Offermann et al.

(10) Patent No.: US 6,629,400 B1
(45) Date of Patent: Oct. 7, 2003

(54) METHOD AND APPARATUS FOR SEALING PACKAGES

(75) Inventors: Jeffrey K. Offermann, Appleton, WI (US); Ryan P. Rosenow, Greenville, WI (US); John L. Herzberg, Butte Des Morts, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/478,874

(22) Filed: Jan. 7, 2000

(51) Int. Cl.[7] .............................................. B65B 51/10
(52) U.S. Cl. ...................................... 53/374.6; 53/371.6
(58) Field of Search ........................... 53/377.7, 375.9, 53/374.6, 374.3, 375.4, 477, 371.6

(56) References Cited

U.S. PATENT DOCUMENTS

| | | | |
|---|---|---|---|
| 4,019,307 A | * | 4/1977 | Ballestrazzi et al. .......... 53/553 |
| 4,313,288 A | * | 2/1982 | Tassi et al. ..................... 53/74 |
| 5,475,964 A | * | 12/1995 | Fiesser et al. ................. 53/675 |
| 5,860,270 A | | 1/1999 | Gerwe |
| 5,861,082 A | | 1/1999 | Ampulski et al. |
| 6,050,065 A | * | 4/2000 | Bonde .......................... 53/550 |
| 6,148,589 A | * | 11/2000 | Fukui et al. ................... 53/442 |
| 6,178,719 B1 | * | 1/2001 | Hansen ....................... 53/374.4 |

* cited by examiner

Primary Examiner—Rinaldi I. Rada
Assistant Examiner—Thanh Truong
(74) Attorney, Agent, or Firm—Dority & Manning, P.A.

(57) ABSTRACT

An apparatus and method is disclosed for sealing in a single package bundles of product cartons which are conveyed in series along a moving conveyor belt. A stationary frame is aligned with the conveyor, and a movable carriage assembly is connected to the frame. Packages or cartons of product are stacked and bundled by film, such as thermoplastic film, in a series of sealing steps. The apparatus includes at least one motor mounted on the stationary frame and capable of engaging the carriage assembly to facilitate reciprocating movement of the carriage assembly in relation to the moving packages. A separate computer controlled servo motor drives the opening and closing of seal bars on the carriage assembly to seal the film at each end of the package.

8 Claims, 5 Drawing Sheets

METHOD AND APPARATUS FOR SEALING PACKAGES

FIELD OF THE INVENTION

This invention relates to a method and apparatus for sealing packages or bundles of product cartons on a conveyor line. In particular, the invention pertains to improved sealing apparatus for individually sealing with film a series or succession of product packages rapidly and efficiently.

BACKGROUND OF THE INVENTION

Many products are shipped and displayed for sale to the public in cartons. Currently, many products are sold in large volumes to small businesses or consumers in warehouse stores and the like. Large volume sales require manufacturers to bundle or attach cartons together using shrinkwrap film and the like. In the sale of facial tissue cartons, for example, it is common to bundle together six, eight, ten or more cartons in a shrinkwrap film package for sale to consumers.

Apparatus for shrinkwrapping cartons together must be capable of rapidly, efficiently, and automatically stacking cartons together in a bundle, wrapping them with film, and sealing the bundle. The process must occur rapidly, and usually is most efficiently performed in a series of steps along a conveyor line. Sealing the shrinkwrap film tightly and securely around the bundle of cartons is necessary to provide a tight bundle that will maintain its integrity during shipment of the products.

One challenge in shrinkwrapping cartons is to improve the speed of the operation so that more cartons per unit time may be wrapped. Heat sealing of shrinkwrapped film requires physically holding together for a predetermined time period two opposing film surfaces. When sealing a convoy or series of bundles in succession, it is usually necessary to move the cartons along a predetermined path in bundles, and then seal each carton on both ends using a sealing mechanism. Many times the sealing mechanism is capable of holding together in close proximity two film surfaces at the end of a bundle. A method and apparatus that can accurately and quickly perform these steps is highly desirable.

SUMMARY OF THE INVENTION

An apparatus and method is provided for sealing bundles of cartons that are passed in series along a moving conveyor line. A frame is aligned with the conveyor, and a movable carriage assembly is connected to the frame. Packages or cartons of product are stacked and bundled by film, such as thermoplastic film, in a series of sealing steps. The apparatus includes at least one motor mounted on the frame which is capable of engaging the carriage assembly to facilitate reciprocating (i.e. back and forth) movement of the carriage assembly in relation to the moving packages. A separate computer controlled servo motor may be employed in some embodiments of the invention to drive the opening and closing of seal bars on the carriage assembly to effect sealing of the film at each end of the package. This drive may use a belt to apply force to the seal bars.

In one embodiment of the invention, a second motor, such as a servo motor, is mounted on the stationary frame. The motor is adapted to engage the carriage assembly to move the upper and lower seal bars in relation to one another, opening and closing the seal nip. In another embodiment of the invention, the first motor means comprises at least one servo drive. In some embodiments, a pair of servo linear slide modules move the carriage back and forth along the conveyor line. The apparatus may contain a second motor that is controlled by electronic signals generated using a microprocessor.

A method of sealing packages with film using a sealing mechanism connected to a reciprocating carriage is disclosed, comprising several steps. First, a first package is provided and surrounded by a film. Then, the step of closing the sealing mechanism upon the film is accomplished, thereby sealing the film on a first end of the first package. A next step involves opening the sealing mechanism. Next, at a predetermined time the carriage is moved in relation to the first package. A next step relates to closing the sealing mechanism upon the film, thereby sealing the film on a second end of the first package. Multiple packages may be sealed in series by repeating the steps of the method. In some applications, the second end of each package is adjacent the first end of the next package in series. The closing of the sealing mechanism upon the film may seal the film on a second end of the first package while simultaneously sealing the first end of a second package. This is so because the packages (bundles of product cartons) may be oriented end-to-end on a conveyor line.

BRIEF DESCRIPTION OF THE DRAWINGS

A full and enabling disclosure of this invention, including the best mode shown to one of ordinary skill in the art, is set forth in this specification. The following Figures illustrate the invention.

DETAILED DESCRIPTION OF THE INVENTION

A general description of the invention is provided below, followed by a more detailed description of the apparatus as shown in the Figures.

The invention includes an electrical and mechanical drive system for the seal bar module of a shrink wrapping machine. Upper and lower seal bars move in a vertical direction to seal and cut off shrinkwrap film between adjacent bundles of product cartons (i.e. hereinafter stacks of cartons shall be called "packages" or "bundles"). Shrinkwrap film is wrapped around the packages and then is sealed longitudinally along the package train before the seal bars make the transverse seal and separate the film between individual packages. The speed which can be obtained depends upon the package height and spacing, and other variables, but may be in the range of about 40 to about 65 packages (bundles of cartons) per minute. Thus, the assembly has the capability to seal one package per second in some configurations.

The mechanical drive system includes seal bars (which move up and down) mounted on a carriage that traverses horizontally along a conveyor line. The carriage, in one embodiment, is mounted upon two linear slide modules mounted on a stationary frame. Each slide has its own gear box and motor.

Two sets of timing belts and pulleys move the seal bars in opposite directions to open and close the sealing nip. A gear box and servo motor is mounted on the frame to power the sealing nip closure by way of a serpentine belt and pulley arrangement. Mounting the relatively bulky and heavy servo drives on the frame, rather than on the carriage, enables faster carriage speeds than could be obtained if the servo motor were mounted on the carriage.

Figure 1:
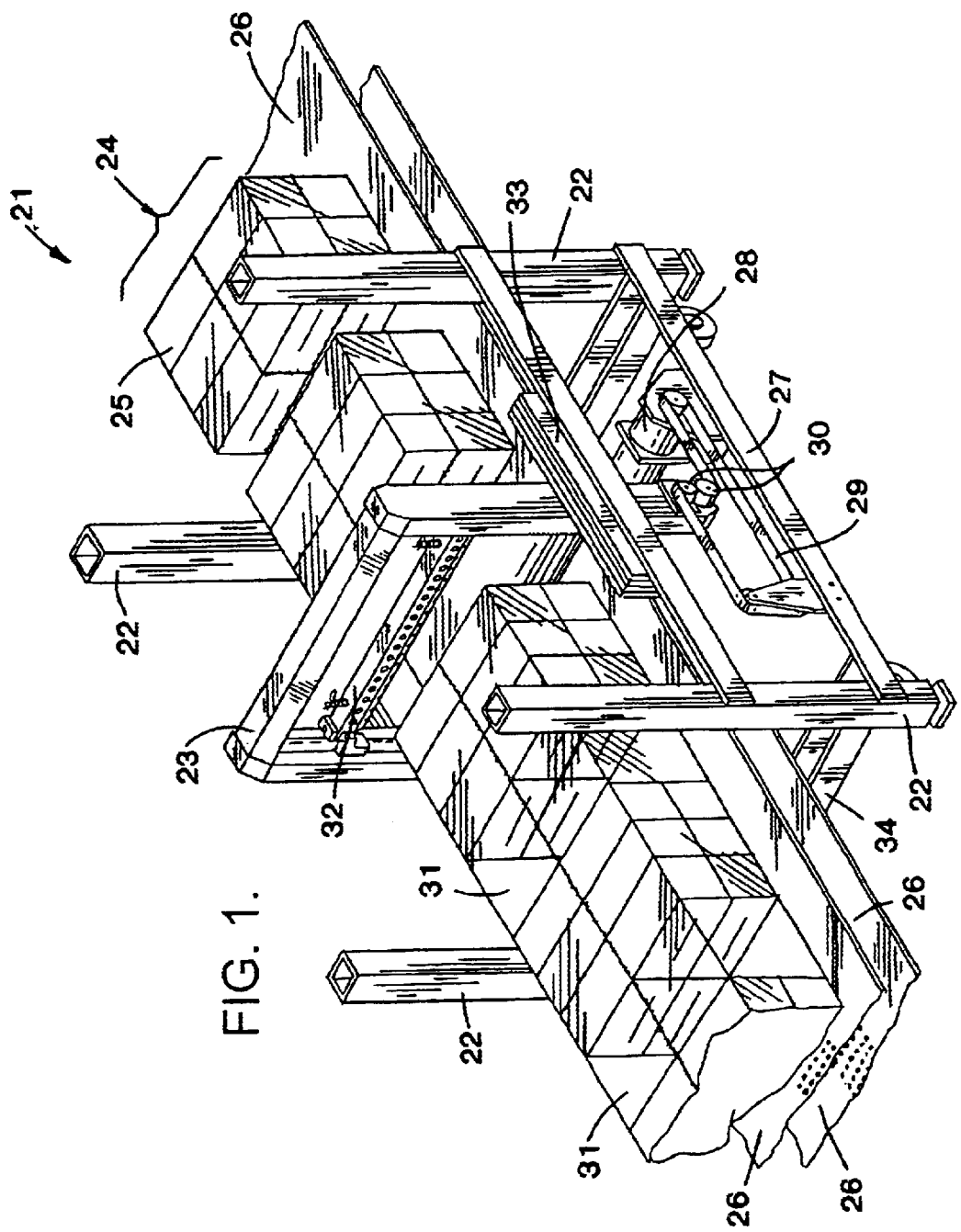
FIG. 1 is a drawing of a perspective view of the conveyor line assembly with frame and movable carriage.

Turning now to FIG. 1, a shrinkwrap station 21 is shown including a frame 22 and a carriage 23 which reciprocates back and forth along the length of conveyor belt 26. A package 24 is shown on the right side of FIG. 1 which in this instance comprises a bundle having 12 cartons of facial tissue (two layer stack). A person of skill in the art would recognize that bundles may be comprised of, for example, single cartons, two cartons, six cartons, eight cartons, ten cartons, twelve cartons, or as many as fifty or even one hundred cartons. Numerous bundle arrangements are possible with the assembly of this invention.

Carton 25 is shown stacked on the second level or tier of the bundle. On the opposite end of the FIG. 1, a sealing wrap 31 is shown surrounding bundles to be sealed. The frame 22 comprises side strut 27 and end strut 34. A motor 28 drives a serpentine belt 29 to move pulleys 30 for opening and closing the seal bar assembly. A linear slide module is located on each side of the carriage, and linear slide module 33 can be seen in FIG. 1. This linear slide module drives the reciprocation of the carriage in a precise and predetermined manner. In one embodiment of the invention, a computer controlled servo controller signals the linear slide modules, resulting in precise and controlled movement of the carriage.

Figure 2A:
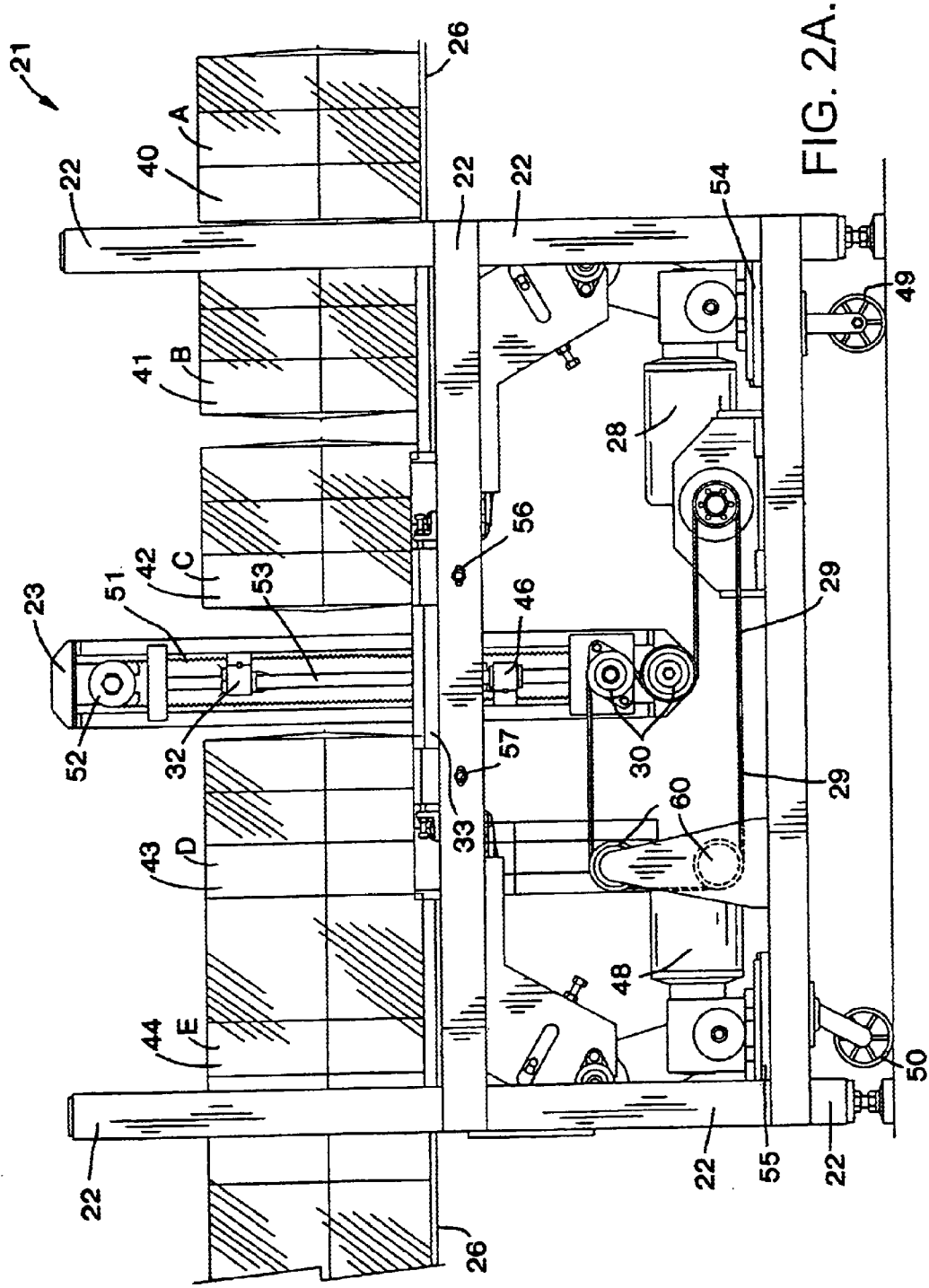
FIG. 2A shows a side view of the assembly with motor, belt, and pulley system with seal bars in the process of opening (separating) after sealing packages C and D.

In FIG. 2A, package A is shown by numeral 40, package B is shown by numeral 41, package C is seen as numeral 42, package D is numeral 43 and package E is shown by numeral 44. The identification of the packages in the Figures allows one to see the movement of the packages along the conveyor in FIGS. 2A, 2B and 2C. Lower seal bar 46 is adapted to engage upper seal bar 32 when the seal bars are in the closed position. Motor 48 drives conveyor belt 26 to convey the packages along the sealing station. Wheels 49 and 50 support the frame. Belt 51 is driven by the pulleys 30 and supported by pulley 52 to actuate the movement of the upper and lower seal bars and to provide appropriate timing in the movement of the seal bars between open and closed positions. Slide rail 53 provides a vertically oriented rail for guiding the seal bars as they move in a vertical direction.

Motor mounts 54 and 55 support their respective motors upon the frame. Frame hubs 56 and 57 assist in providing a reference point to indicate carriage position location relative to the frame.

Figure 2B:
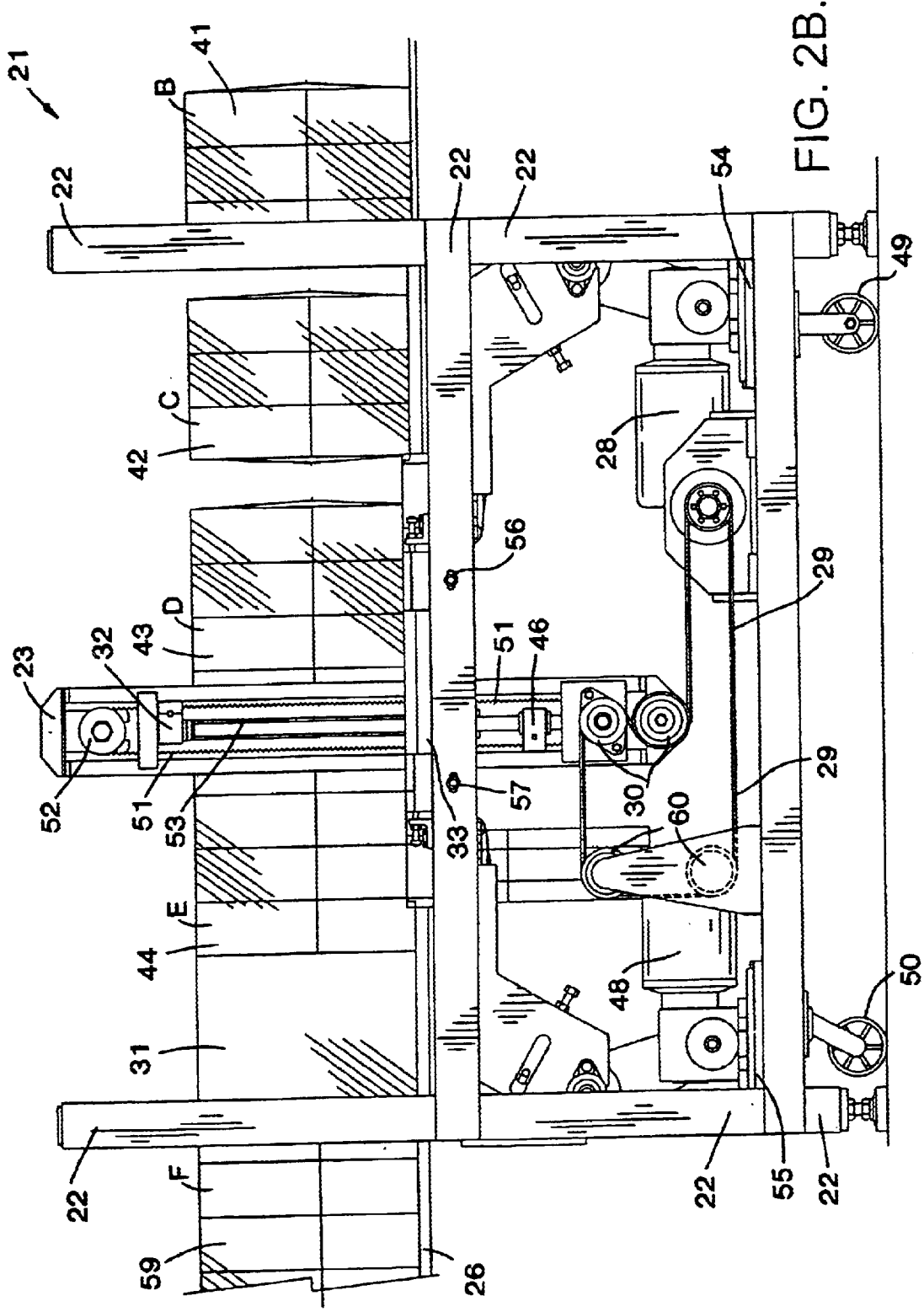
FIG. 2B depicts the carriage seal bars in the fully open position, with the carriage having traveled down the conveyor line (to the left) to engage the next packages D and E.

Turning to FIG. 2B, the carriage seal bars may be seen in the fully open position, with the carriage having traveled down the conveyor line (to the left) to engage the next packages D and E. Package F (indicated by numeral 59) is shown on the left portion of the conveyor line. Pulleys 60 receive power from serpentine belt 29.

Figure 2C:
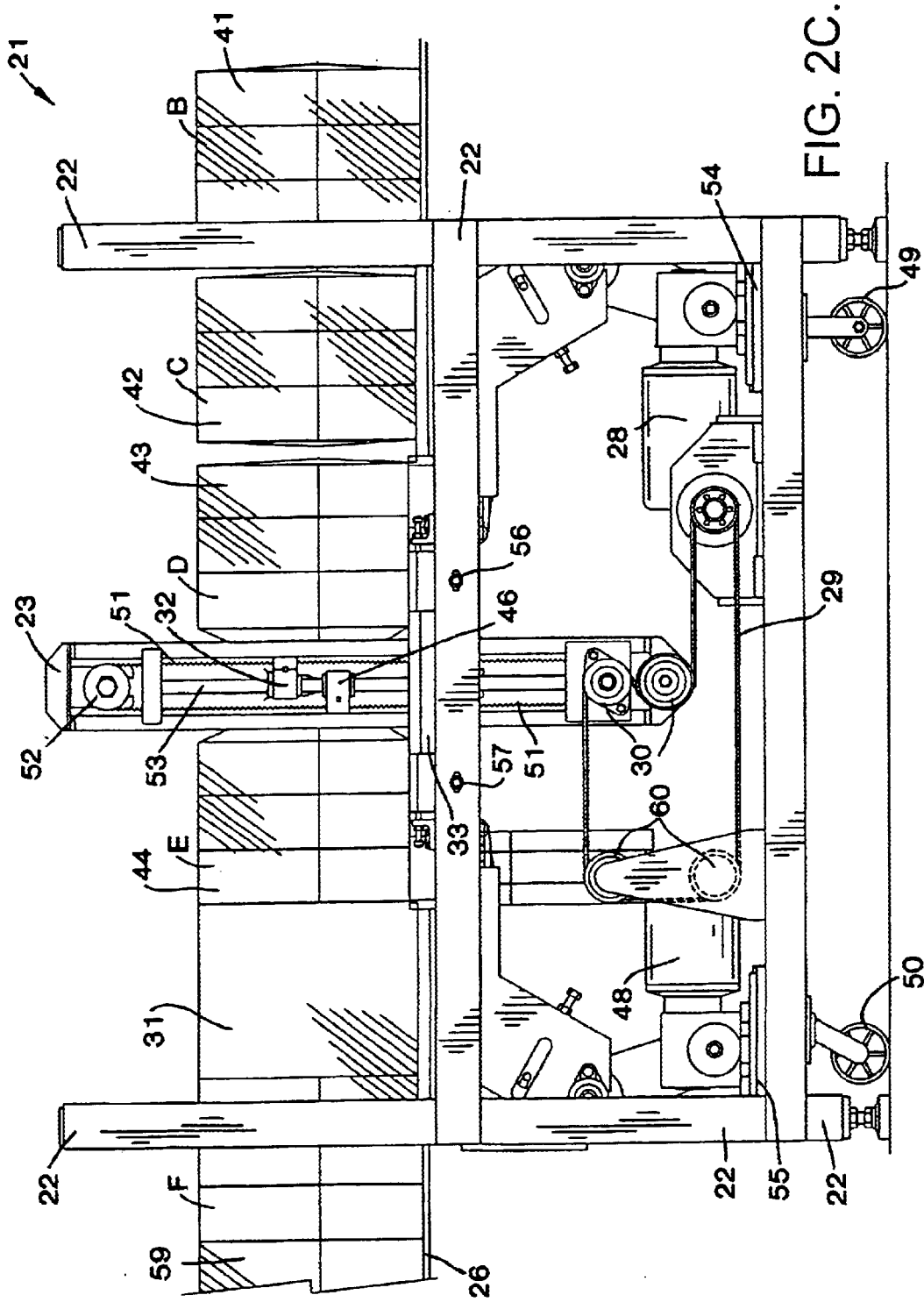
FIG. 2C shows the seal bars in the closed position during the sealing of film on the ends of packages D and E.
Figure 2D:
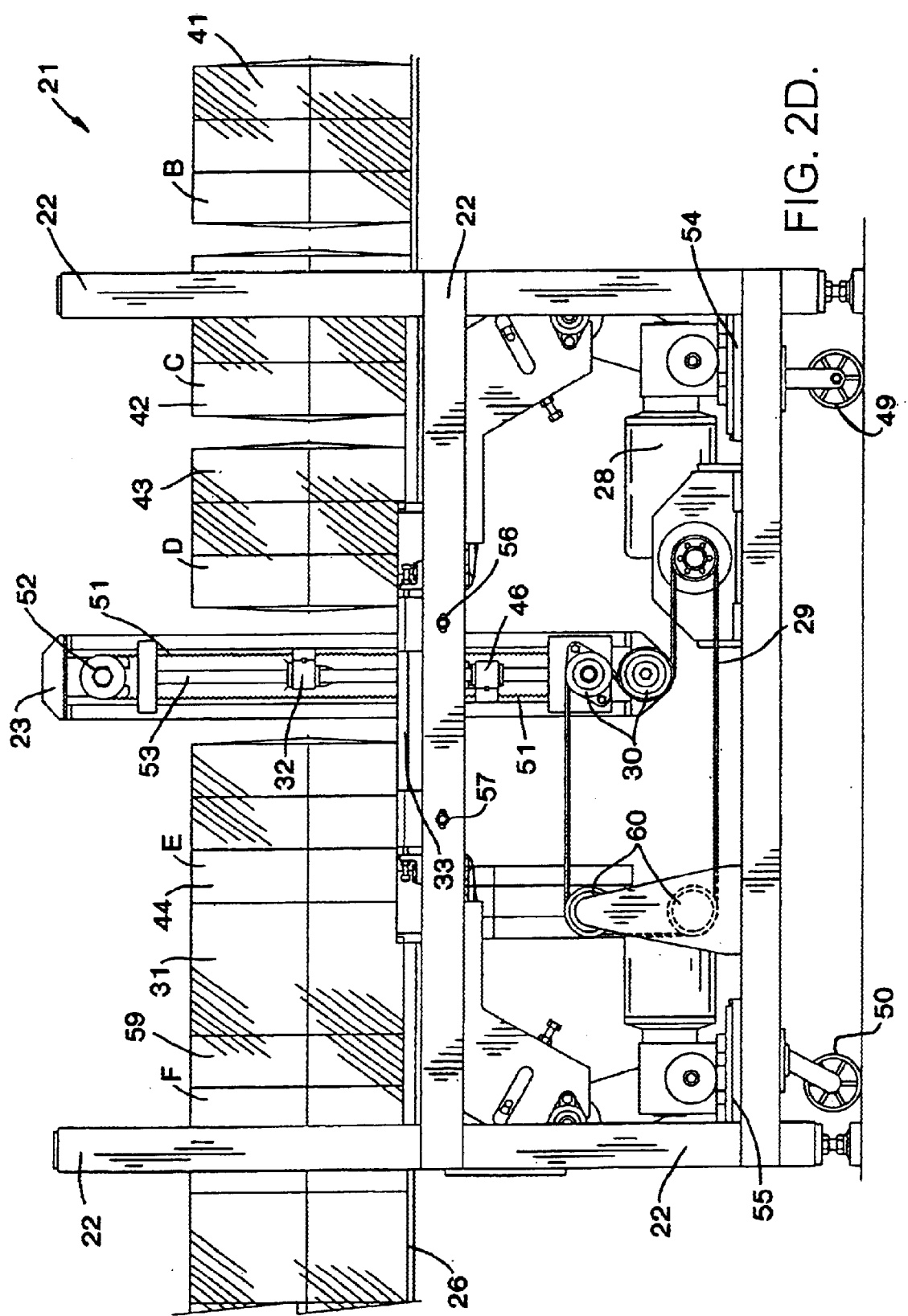
FIG. 2D shows the seal bars re-opening to begin their travel across package E to seal the film between packages E and F.

FIG. 2C shows the seal bars in the closed position during the sealing of film on the ends of packages D and E. FIG. 2D shows the seal bars re-opening to begin their travel across package E to seal the film between packages E and F. The process is repeated at a rapid pace for successive packages or bundles. Bundles move to the shrinkwrap station continuously at a constant velocity.

The lower seal bar is attached to a two position link using a quick release pin, providing for a 10.76 inch opening for two layer package bundles, and a 6.02 inch opening for single layer codes.

The electrical drive system includes linear slides that control the carriage stroke. The horizontal linear displacement of about 8.00 inches allows time for sealing and return strokes. During the seal stroke the carriage moves at a constant velocity for about 250 milliseconds which is the customary time required for making the transverse seal. In general, the sealing velocity must match the bundle or package speed. Typical values for acceleration and deceleration rates are: 240 inches/sec$^2$ and a velocity of 23.5 inches/sec. During the return stroke a constant carriage velocity is not desired but a minimum return time is required. Typical acceleration/deceleration rates are 250 inches/sec$^2$. The seal bar drive motor controls the opening and closing of the seal bars. The seal bars should close quickly, but not before the carriage has reached a constant velocity. Likewise, the seal bars need to open very fast and they are fully open or almost fully open before the carriage starts a return stroke.

The seal bar drive motor also controls the nip pressure of the seal bars during sealing of the packages. The nip pressure consists of two elements, a force of 55 pounds to compress the pressure pad and a force of about 145 pounds to create nip pressure for sealing and cut-off. A motor torque of 54 inch-pounds, with a reducer output torque of 320 inch-pounds, is required to produce a total nip force of 200 pounds or about 8.33 pounds per linear inch. In most applications, the two seal bar carriage drive motors (i.e. servo motors controlling carriage reciprocation and servo motors controlling seal bar opening/closing) make simultaneous moves as each moves on opposite ends of the carriage. The move commands may be made by any system, manual or computer controlled. The commands may be powered and instructed by electrical impulses from any reliable source. A desirable system is to use computer or microprocessor controlled signals to control the motion of the carriage assembly. Servo controller software available from Allen Bradley Company (Allen Bradley product code #1494) of 1201 South Second Street, Milwaukee, Wis. may be used advantageously.

The servo controller software acts as an "electronic cam" in controlling the carriage seal bar mechanism. Software is designed to constantly compensate for the position of the carriage, thereby allowing for precise movement to the exact position at the time necessary to enable smooth and efficient operation of the assembly. In one embodiment of the invention, the primary control of the shrinkwrap assembly resides in an Allen Bradley (AB) PLC 5/E processor. The primary function of the PLC is to serve in a gateway/pass-through capacity. The PLC also hosts the programming controlling the shrink wrapper and alarming logic. The PLC provides parameter move commands to a 1394 Allen Bradley servo controller which controls four axis modules. A person of skill in the art, upon assembling the apparatus and purchasing the Allen Bradley products detailed herein is capable of efficiently operating the apparatus and method of this invention. The assembly may have at least two modes of operation. These two modes are automatic mode and manual mode.

In the automatic mode, all systems run automatically. For the diverter section (not shown in Figures), this includes counting and diverting the necessary amount of product into the upper and lower infeed conveyors for both single and double layer codes. For the flying bar section (not shown in the Figures), this includes separating transporting, and orientating the product through the shrink wrapper system at the proper speed and control. For the seal section, this includes providing bundle spacing and necessary temperature to seal the wrapped packages. It also includes operation of the seal bars to seal packages at the correct placement, and with appropriate timing. For the heat tunnel section, this includes heating and transporting. In the automatic mode, packages are transported through the shrink wrapper, stacked, wrapped, sealed and transported to the next packaging area. In the manual mode, the machine operation can be enabled as needed. Diverter, flying bar conveyor, film feed, vacuum conveyor, seal bar carriage, seal bar, take away conveyor and shrink tunnel conveyors can be jogged in the forward and reverse direction. Manual sealing may be conducted. Full machine jog is allowed for troubleshooting and control adjustment. The diverter area (not shown in the Figures) is contemplated by a person of skill in the art, and is of the type widely used in the industry. The diverter area receives product, groups cartons into the correct product counts, positions the slugs into correct lane and transfers the product to the transport area. Diverter area equipment includes a linear actuator style lane diverter driven by an Allen-Bradley 1394 Servo, an infeed conveyor powered by an Allen-Bradley 1305 controller, a clamping mechanism prior to the infeed of the diverter, an exit gate, and an upper and lower conveyor controlled by Allen-Bradley 1305s. A photoeye in front of the Diverter Clamp (approximately 6 feet) ensures there is sufficient product to fill the Diverter and clamp.

The film feed section lifts and rotates rolls of shrink film into the machine, unwinds the shrink film to supply the machine, perforates the shrink film (this allows air to escape as the film is shrinking), maintains constant shrink film web tension and aligns the shrink film web to the film former. The film feed section equipment includes a roll handler, a shrink film surface unwind, a counterweighted dancer, a driven dancer feed nip, a microperf roller and a fife guide. The film former (not shown in the Figures) guides the film over and around the groups of cartons and forms the poly into a tube and seals the top of this tube of polymer film. The film former section includes the mechanical film guides (the former), a motor that raises the top carton guide, a static seal and a heated drag seal. The seal bar section receives product, wraps the product with shrink film, seals the wrapped packages, and transports the wrapped packages to the heat tunnel section. The seal bar section equipment includes a vacuum belt, the seal bar carriage, the transfer belt, and Watlow temperature controllers available from the Watlow company, located at 12001 Lackland Road, St. Louis, Mo.

The seal bars may be advantageously positioned by axis modules from an Allen-Bradley 1394 Servo controller. The vacuum conveyor receives and conveys product inside a tube of shrink film. The relative speeds of the flying bar and vacuum conveyors control the spacing between bundles.

The shrink tunnel section receives product packages from the seal bar section, conveys and shrinks the shrink film to tightly fit the product by directing heated air on to the passing bundles and transfers bundles to the downstream process. The heat tunnel section equipment includes a transfer conveyor, two hot air zones with heaters, blowers and duct work and Chromalox PID temperature controller available from the Emerson Electric Company located at 701 Alpha Drive, Pittsburgh, Pa.

Film unwind speed set point does not change with machine speed. So, the unwind speed must be set at a speed greater then the maximum speed the machine will run for the current grade. Running at a speed which is too slow will cause film breaks.

These and other modifications of this invention may be practiced by one of ordinary skill in the art within the spirit of the invention. The invention is particularly set forth in the appended claims. Further, it should be understood that aspects of the various embodiments disclosed in this specification may be interchanged both in whole or in part, without departing from the invention. Furthermore, those of ordinary skill in the art will appreciate that this description is by way of example only, and does not limit the invention as described in the claims.

What is claimed is:

1. An apparatus for sealing bundles of packages conveyed in series along a conveyor line, comprising:
    (a) a stationary frame aligned with a conveyor line,
    (b) a movable carriage assembly connected to the stationary frame, the carriage assembly being capable of reciprocating along the length of the conveyor line, the carriage assembly further comprising upper and lower seal bars, wherein the seal bars move in close proximity to each other to form a seal nip in sealing bundles, and
    (c) a first motor means, the first motor means being mounted on the stationary frame and capable of generating electrical signals that control the carriage assembly to facilitate reciprocating movement of the carriage assembly; and
    (d) a second motor mounted upon the stationary frame, the second motor being adapted to drive the upper and lower seal bars in relation to one another to open and close the nip.

2. The apparatus of claim 1 in which the first motor means comprises at least one servo drive.

3. The apparatus of claim 1 in which the first motor means generates electrical signals that serve to actuate at least one linear slide module, thereby controlling movement of the carriage assembly.

4. The apparatus of claim 1 further including a pair of motor-driven linear slide modules, with one slide module positioned on each side of the carriage, further wherein the pair of linear slide modules operatively connect the carriage assembly to the stationary frame.

5. The apparatus of claim 1 in which the second motor drives the seal bars of the carriage assembly using a belt.

6. The apparatus of claim 1 in which the second motor comprises a servo mechanism.

7. The apparatus of claim 6 in which the second motor is controlled by electronic signals generated using a microprocessor.

8. A device for sealing packages moving in series along a conveyor line, comprising:
    (a) a frame aligned with a conveyor line,
    (b) a carriage assembly connected to the frame, the carriage assembly being capable of back and forth movement along the length of the conveyor line, the carriage assembly further comprising upper and lower seal bars, wherein the seal bars move in close proximity to each other to form a seal nip in sealing packages, and
    (c) a first servo motor means, the first servo motor means being mounted on the frame and capable of engaging the carriage assembly to facilitate back and forth movement of the carriage assembly along the conveyor line, and
    (d) a second servo motor means mounted on the frame and engaging the carriage assembly with a drive belt, wherein the drive belt controls movement of the upper and lower seal bars in relation to each other.

* * * * *